us005554016A

United States Patent [19]

Sasano et al.

[11] Patent Number: 5,554,016
[45] Date of Patent: Sep. 10, 1996

[54] SPRING CONFIGURATION FOR A HERMETIC COMPRESSOR DISCHARGE VALVE

[75] Inventors: Hiroshi Sasano; Masao Mangyo; Koshi Hamada; Akihiko Kubota, all of Fujisawa, Japan

[73] Assignee: Matsushita Refrigeration Company, Osaka, Japan

[21] Appl. No.: 330,819

[22] Filed: Oct. 24, 1994

[30] Foreign Application Priority Data

Nov. 25, 1993 [JP] Japan .................. 5-295157

[51] Int. Cl.[6] ............................................. F04B 53/10
[52] U.S. Cl. ........................................ 417/569; 137/857
[58] Field of Search ................... 417/569, 571; 137/857, 527.1

[56] References Cited

U.S. PATENT DOCUMENTS

| | | | |
|---|---|---|---|
| 4,524,806 | 6/1985 | Rømer | 137/857 |
| 4,723,896 | 2/1988 | Fritchman | 137/857 |
| 5,178,183 | 1/1993 | Kim | 137/857 |
| 5,209,260 | 5/1993 | Baek | 417/569 |

FOREIGN PATENT DOCUMENTS

| | | | |
|---|---|---|---|
| 3-260383 | 11/1991 | Japan | 417/571 |
| 9318304 | 9/1993 | WIPO | |

Primary Examiner—Louis J. Casaregola
Assistant Examiner—Roland G. McAndrews, Jr.
Attorney, Agent, or Firm—Lowe, Price, LeBlanc & Becker

[57] ABSTRACT

A hermetic compressor for use in refrigeration systems is provided. The hermetic compressor includes a compressor unit disposed within an enclosed compressor casing. The compressor unit has a compression chamber and a valve assembly having an inlet port arranged to introduce refrigerant into the compression chamber and an outlet port for discharging the refrigerant compressed in the compression chamber. The valve assembly includes a valve plate, a single outlet reed valve, and a spring member. The valve plate has formed therein a recessed portion in which the outlet port is formed. The outlet reed valve has a supporting portion and a valve portion for selectively opening and closing the outlet port according to a pressure level of the refrigerant compressed in the compression chamber. The recessed portion has protrusions to define an outlet reed valve housing in which the supporting portion of the valve portion of the outlet reed valve is secured. The spring member has a plate portion and a plurality of legs, extending from the plate portion, designed to engage the protrusions of the recessed portion to retain the outlet reed valve in the outlet reed valve housing and to provide a spring force serving to restrict opening motion of the valve portion of the outlet reed valve.

8 Claims, 7 Drawing Sheets

SPRING CONFIGURATION FOR A HERMETIC COMPRESSOR DISCHARGE VALVE

BACKGROUND OF THE INVENTION

1. Technical Field of the Invention

The present invention relates generally to a hermetic compressor, and more particularly to an improved structure of a hermetic compressor for compressing refrigerant used in a refrigeration system such as an electric refrigerator.

2. Background Art

Various compressors for use in refrigeration systems are known in the art. In recent years, high energy efficiency and noiseless compressors are sought.

U.S. Pat. No. 4,723,896 discloses a conventional hermetic compressor wherein the size of an outlet port formed in a valve plate is decreased for promoting the efficiency of compression. This compressor includes a reed valve arranged on the outlet port of the valve plate, a support spring, a valve stopper, and a holding spring which are mounted on the reed valve to form a preassembly. The mounting of the reed valve, the supporting spring and the valve stopper in a compressor casing is accomplished by pressing the holding spring when a cylinder head is installed on a cylinder block.

The above compressor, however, encounters a drawback in that it is difficult to check whether the reed valve and a spring urging the reed valve to a closed state have been arranged properly or not.

Figure 11:
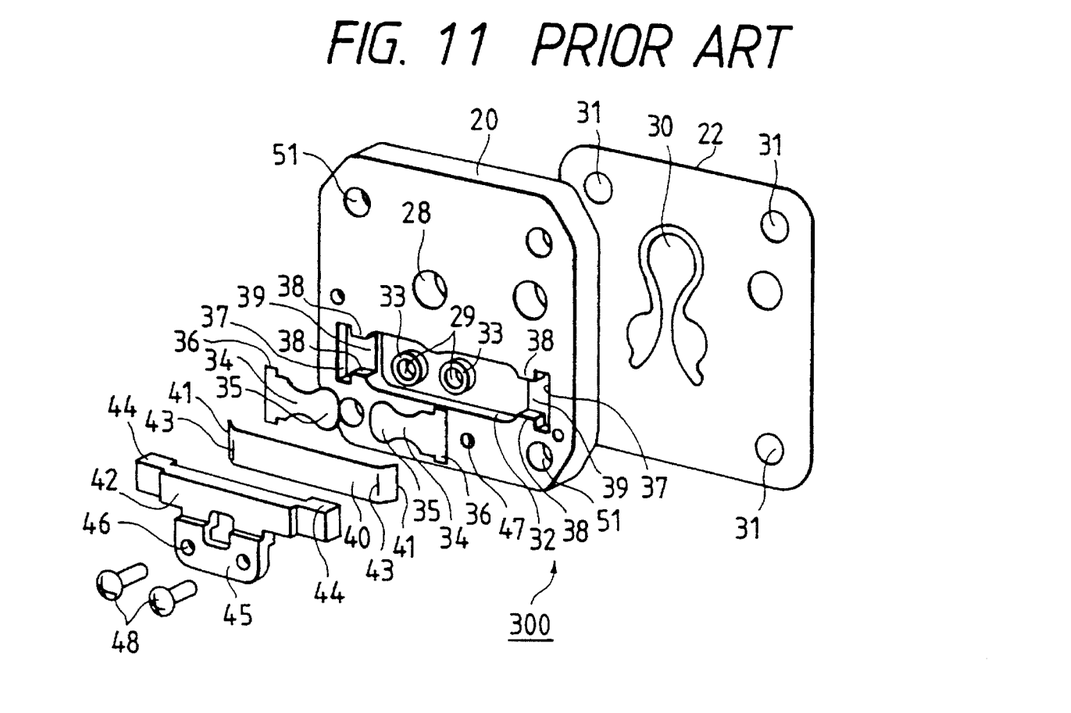
FIG. 11 is an exploded perspective view which shows a valve assembly of a conventional compressor unit.

Japanese Patent First Publication No. 04-506082 teaches a hermetic compressor designed for improving the energy efficiency. FIG. 11 shows this prior art compressor. A valve plate assembly 300 includes an inlet reed valve 22, a valve plate 20, a pair of outlet reeds 34, a reed spring 40, a stopper 42, and rivets 48.

The valve plate 20 has formed therein an inlet port 28 and two outlet ports 29. The inlet port 28 communicates with a compression chamber of a compressor unit for introducing refrigerant gas thereinto. The outlet ports 29 discharge the refrigerant gas compressed in the compression chamber to an outlet plenum formed in a cylinder head.

The inlet reed valve 22 is made of a fiat plate and forms an inlet valve 30 and four mounting holes 31 in its corners in alignment with mounting holes 51 formed in the valve plate 20.

An elongated recessed portion 32 is formed in the valve plate 20 which has formed therein the outlet ports 29. Annular valve seas 33 are formed coaxially with the outlet ports 29. The height of the valve seats 33 are set smaller than the depth of the recessed portion 32.

Each outlet reed valve 34 includes a sealing portion 35 and a pair of extensions 36. The recessed portion 82 has formed on its inner side walls two pairs of protrusions 38 inwardly oriented to each other to define end housings between the protrusions 38 and end walls 37, respectively. The extensions 36 of each outlet reed valve 34 are fitted into the end housing 38. A bottom of each end housing rises to form a stepped portion 39 which has substantially the same height as that of the valve seats 33. The outlet reed valves 34 are mounted in the recessed portion 32 in contact with the stepped portions 39 and the valve seats 33.

The reed spring 40 Is formed with a strip plate which has both ends 41 bent at a given angle and has the length shorter than an interval between the end walls 37 of the recessed portion 32. The reed spring 40 is mounted in the recessed portion 32 through the outlet reed valves 34 with both ends 41 thereof pressing the outlet reed valves 34.

The stopper 42 includes a pair of stepped portions 44 and a mounting portion 45. The mounting portion 45 secures the stopper 42 on the valve plate 20 using the rivets 48. The stepped portions 44 are partly inserted into the recessed portion 32 so that they press bent portions 43 of the reed spring 40 under a given pressure. These arrangements provides high compression efficiency. The provision of the two outlet ports 29 prevents overcompression loss from being increased.

The above prior art compressor, however, has suffered from the drawback in that the two outlet ports 29 cause operational noise to be increased. In addition, when refrigerant gas HFC-134a is used in place of CFC-12, heavier noise is found to be produced.

SUMMARY OF THE INVENTION

It is therefore a principal object of the present invention to avoid the disadvantages of the prior art.

It is another object of the present invention to provide an improved noiseless structure of a hermetic compressor which provides a high energy efficiency ratio even when refrigerant HFC-134a is used.

According to one aspect of the present invention, there is provided a hermetic compressor which comprises an enclosed compressor casing and a compressor unit disposed within said compressor casing. The compressor unit includes a compression chamber and a valve assembly having an inlet port arranged to introduce medium to be compressed into the compression chamber and an outlet port arranged to discharge the medium compressed in the compression chamber. The valve assembly includes a valve plate, a single outlet reed valve, and a spring member. The valve plate has formed therein a recessed portion in which the outlet port is formed. The outlet reed valve has a supporting portion and a valve portion for selectively opening and closing the outlet port according to a pressure level of the medium compressed in the compression chamber. The recessed portion has protrusions to define an outlet reed valve housing in which the supporting portion of the outlet reed valve is secured. The spring member has a plate portion and a plurality of legs, extending from the plate portion, designed to engage the protrusions of the recessed portion to retain the outlet reed valve in the outlet reed valve housing and to provide a spring force serving to restrict opening motion of the valve portion of the outlet reed valve.

In the preferred mode, the legs of the spring member are bent relative to the plate portion to have a given height from the plate portion so as to create a preselected interval between the outlet reed valve and the plate portion of the spring member.

The given height of the legs may be set to a value of more than four times the thickness of the outlet reed valve.

The spring member includes a mounting portion which secures the reed spring valve on the valve plate.

The valve assembly further includes a mounting member for mounting the spring member in the recessed portion of the valve plate through the outlet reed valve.

The mounting member includes a body portion and stepped portions. The stepped portions are arranged to have a predetermined interval between the spring member and the body portion and to press the spring member under a given pressure.

The mounting member may alternatively include two curved portions to form a contact surface therebetween and pressing end surfaces. The pressing end surfaces are arranged to press the spring member under a given pressure. The contact surface are arranged to restrict deformation of the spring member when pushed by the outlet reed valve being opened.

The legs of the spring member are arranged at a given interval in a longitudinal direction of the plate portion to engage the protrusions of the recessed portion to retain the spring member in the recessed portion.

In addition, the legs of the spring member extend from the plate portion in opposite directions to form two contact points with the outlet reed valve.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings.

DESCRIPTION OF THE PREFERRED EMBODIMENT

Figure 1:
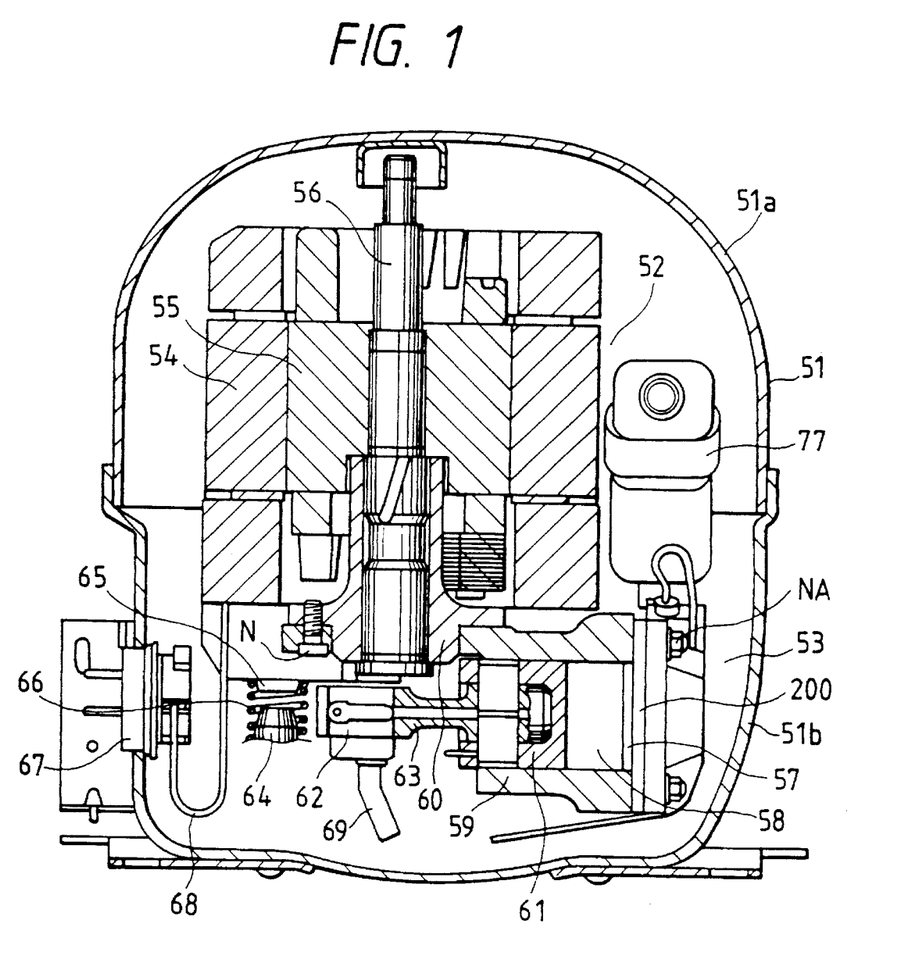
FIG. 1 is a cross-sectional view which shows a hermetic compressor according to the present invention.

Referring now to the drawings, wherein like numbers refer to like parts in several views, particularly to FIG. 1, there is shown a hermetic compressor according to the present invention which may be employed in refrigeration systems such as refrigerators.

The hermetic compressor includes generally an enclosed compressor casing 51, a motor unit 52, and a compressor unit 53 for compressing refrigerant gas circulating through a refrigeration system (not shown).

The compressor casing 51 is formed with upper and lower portions whose peripheral edges are hermetically sealed by welding or in any other similar manner. The motor unit 52 and the compressor unit 53 are elastically disposed within the compressor casing 51 for absorbing vibrations. The motor unit 52 is provided with a stator 54, a rotor 55, and a crankshaft 56.

The compressor unit 53 is located beneath the motor unit 52, and includes a cylinder block 59 and a supporting member 60 which are secured together through a screw N. The supporting member 60 is arranged to support the crankshaft 56 of the motor unit 52. The cylinder block 59 forms therein a cylindrical chamber or compression chamber 58 having an end portion 57 defining an opening. A piston 61 is disposed slidably in the compression chamber 58 in drive connection with a crank portion 62 of the crankshaft 56 through a connecting rod 63. The cylinder block 59 is elastically supported by the lower portion 51b of the compressor casing 51 through a support pin 64, compression spring 66, and a mounting pin 65.

An oil supply pile 69 is secured to a lower portion of the crankshaft 56 for supplying a lubricating oil collected on the bottom of the lower portion 51b of the compressor casing 51 to some mechanical component parts according to rotation of the crankshaft 56.

A terminal or plug 67 is installed in the lower portion 51b of the compressor casing 51 for power supply to the motor unit 52. The plug 67 is connected to the stator 54 through a reed wire 68.

Figure 2:
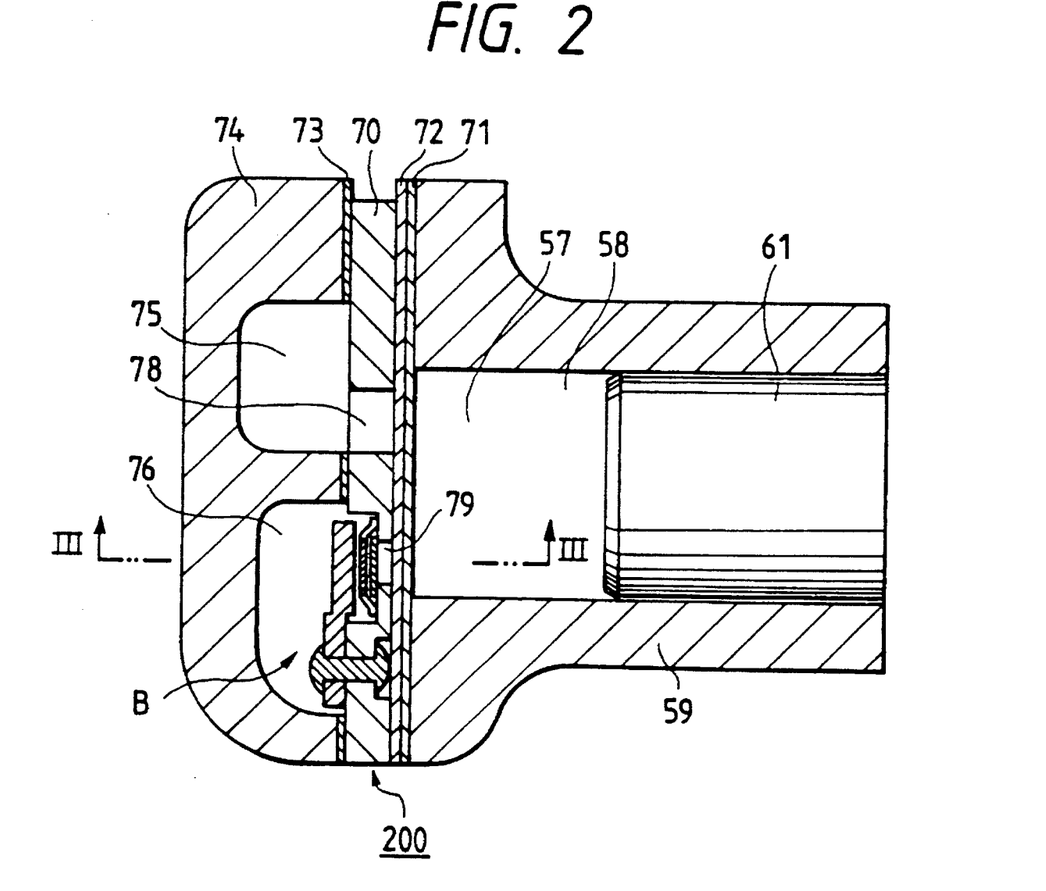
FIG. 2 is a partially cross-sectional view which shows a valve assembly of a compressor unit.

A valve assembly 200 is provided which closes the opening end portion 57 of the cylindrical chamber 58 of the cylinder block 59. The valve assembly 200, as shown in FIG. 2, includes a valve plate 70 and an inlet reed valve 72. Arranged between the inlet reed valve 72 and an end wall of the cylinder block 59 is a plate gasket 71, while a head gasket 73 is interposed between the valve plate 70 and a cylinder head 74. The cylinder head 74 is, as shown in FIG. 1, secured at its four corners to the cylinder block 59 through bolts NA.

The cylinder head 74 has formed therein an inlet plenum chamber 75 and an outlet plenum chamber 76 opening toward the valve plate 70. To the inlet plenum chamber 75, a synthetic resin-made muffler 77 is, as shown in FIG. 1, joined which also connects with an inlet port of the refrigerant system arranged outside the compressor casing 51.

Figure 3:
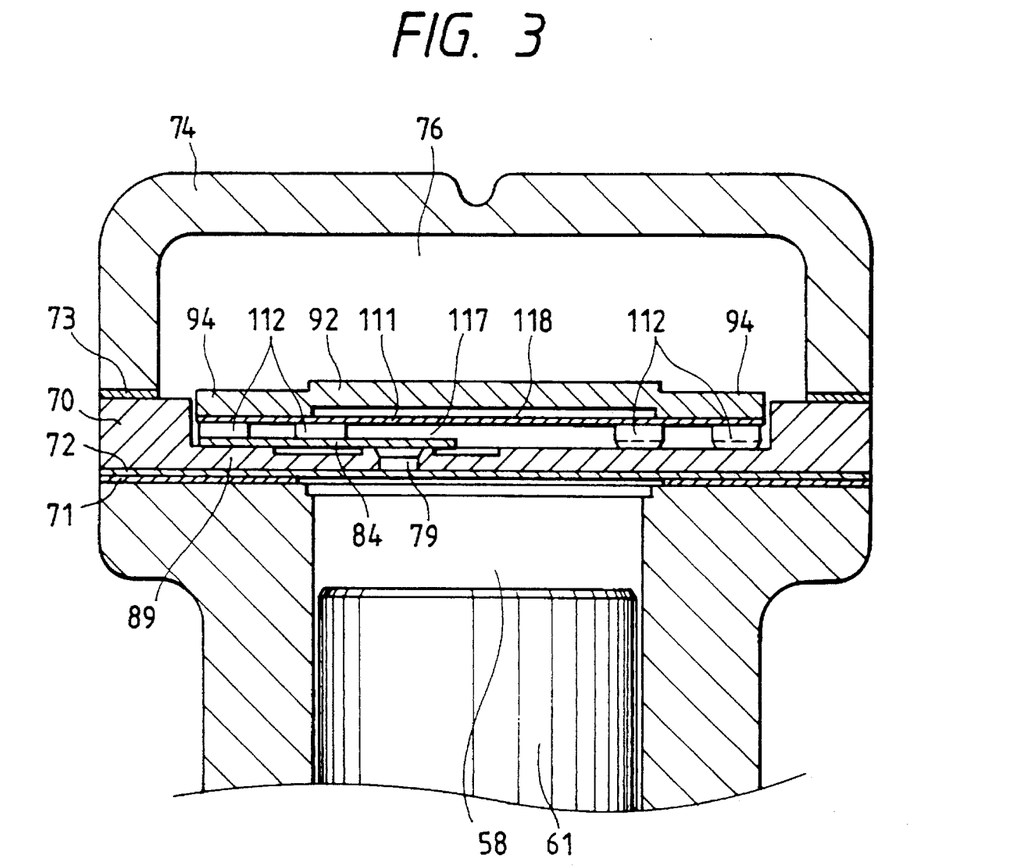
FIG. 3 is a partially cross-sectional view taken along the line III—III in FIG. 2.

The valve plate 70 has formed therein an inlet port 78 which establishes communication between the inlet plenum chamber 75 and the compression chamber 58, and also has an outlet port 79, as shown in FIGS. 2 and 3, for discharging refrigerant gas compressed in the compression chamber 58 to the outlet plenum chamber 76. The inlet reed valve 72 is, as shown in FIG. 5, made of a plate member whose central portion is cut out to form a valve 80 and has four holes 81 formed in its corners in coincidence with holes 101 formed in the valve plate 70 through which the screws NA are inserted.

Figure 4:
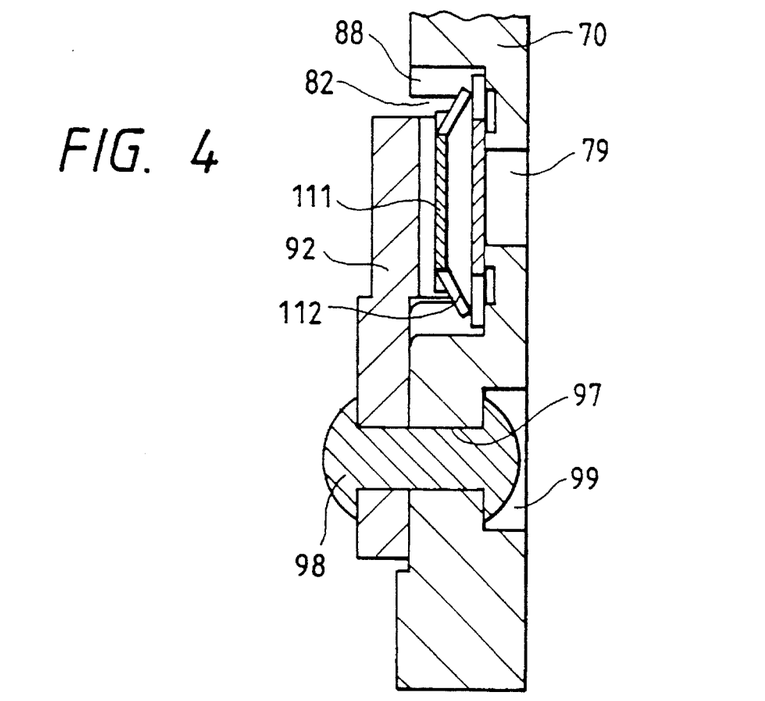
FIG. 4 is an enlarged partially sectional view which shows a portion of a valve assembly indicated by an arrow B in FIG. 2.
Figure 5:
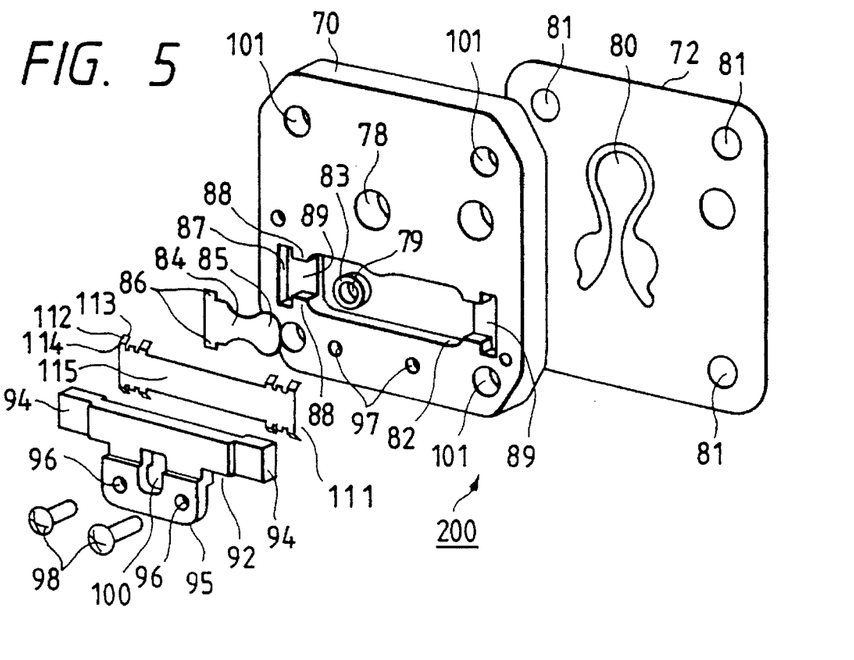
FIG. 5 is an exploded perspective view which shows a valve assembly of a compressor unit.

An elongated recessed portion 82 is, as shown in FIGS. 4 and 5, formed in a portion of the valve plate 70 opposite the piston 61 15 and the compression chamber 58. The recesses portion 82 has formed therein the outlet port 79. An outlet annular valve seat 83 is formed on the recessed portion 82 coaxially with the outlet port 79, and has the height smaller than the depth of the recessed portion 82 so that it may not project from the recessed portion.

An outlet reed valve 84 includes a sealing portion 85 for covering the outlet seat 83 and a pair of extensions or lugs 86 extending from an end thereof in opposite directions. The recessed portion 82 has formed on its inner side walls a pair of protrusions 88 inwardly oriented to each other to define an end housing 87 in which the lugs 86 of the outlet reed valve 84 are fitted. In addition, a bottom of the end housing 87, as shown in FIGS. 3 and 5, rises to form a stepped portion 89 which has the height substantially equal to that of the outlet valve seat 83. With these arrangements, the outlet reed valve 84 is, as shown in FIG. 3, retained in the recessed portion 82 flush with the stepped portion 89 and the valve seat 83.

Figure 6:
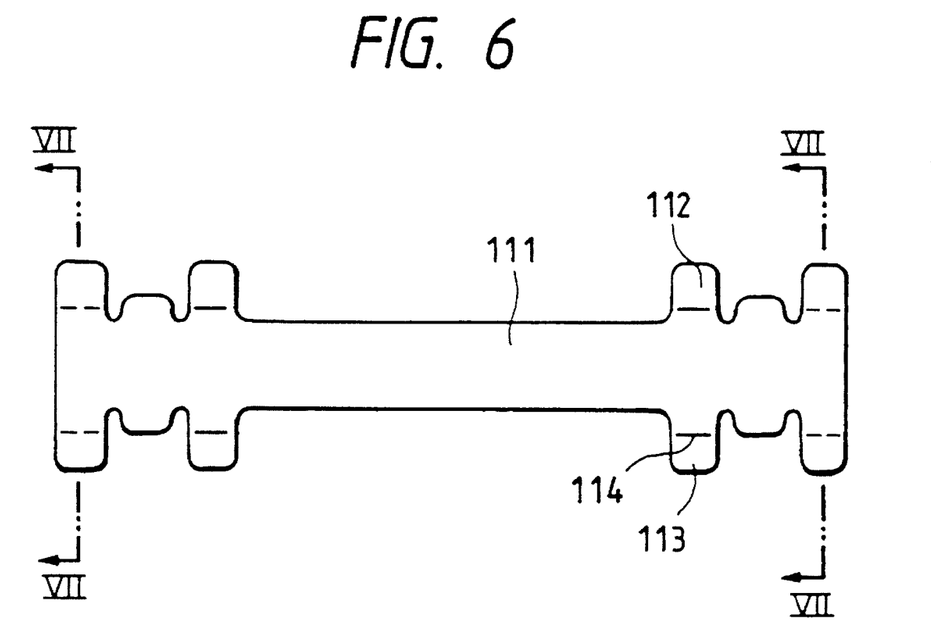
FIG. 6 is a front view which shows a reed spring of a valve assembly.

A reed spring 111 is, as shown in FIGS. 5 and 6, provided to support the outlet reed valve 84 under a given degree of spring force. The reed spring 111 includes a strip portion 115 and a plurality of legs 112 including bent portions 114 which are inclined at a given angle so as to form clearance 117, as shown in FIG. 3, between the strip portion 115 and the outlet reed valve 84. The legs 112 extend from both sides of the strip portion 115 perpendicular to the center line of the strip portion 115 and are arranged longitudinally of the spring portion at a given interval. The reed spring 111 engages the recessed portion 82 so that ends 113 of the outermost legs 112 (i.e., the leftmost legs as viewed in FIG. 5), as shown in FIGS. 3 to 5, may press the lugs 86 of the outlet reed valve 84 under a given pressure.

A stopper or retainer 92 is provided to retain the reed spring 111 and the outlet reed valve 84 in the recessed portion 82 of the valve plate 70. The retainer 92 includes a mounting portion 95 and a pair of stepped portions 94 formed to produce clearance 118, as shown in FIG. 3, between the mounting portion 95 and the reed spring 111. The mounting portion 95 secures the retainer 92 on the valve plate 70. The stepped portions 94 are, as shown in FIG. 3, partly inserted into the recessed portion 82 so that they press the reed spring 111 under a given pressure.

The mounting portion 95 has formed therein two holes 96 in alignment with holes 97 formed in the valve plate 70. The valve plate 70, as shown in FIG. 4, has formed therein counterbores 99 around the holes 97. Rivets 98 are inserted into the holes 97 of the valve plate 70 through the holes 96 of the retainer 92 and then staked in the counterbores 99 to secure the retainer 92 on the valve plate 70. The counterbores 99 have a sufficient depth so that the staked heads of the rivets 98 may not project from a surface of the valve plate 70.

When the retainer 92 is, as shown in FIGS. 3 and 4, riveted to the valve plate 70, the stepped portions 94 of the retainer 92 press the reed spring 111, causing the legs 112 to create a given degree of spring force at the ends 113 acting on the lugs 86 of the outlet reed valve 84. This spring force serves as an opening control pressure at which the outlet reed valve 84 opens the outlet port 79. With the above mentioned structure, the opening control pressure may be adjusted finely as compared with a conventional structure.

The retainer 92 also has formed in its central portion an opening 100 which communicates with the recessed portion 82 for directing the refrigerant gas flow from the outlet port 79 to the outlet plenum chamber 76.

Figure 7:
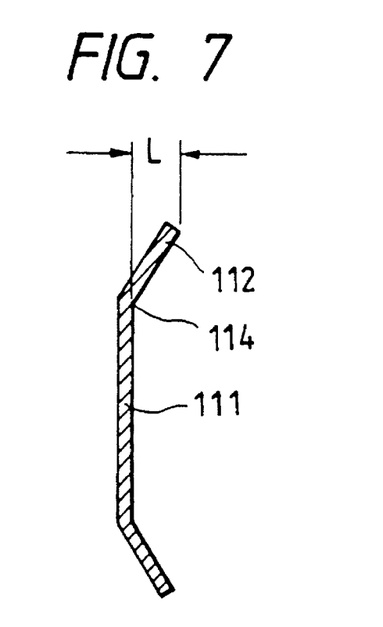
FIG. 7 is a cross-sectional view which shows a reed spring taken along the line VII—VII in FIG. 6.

FIG. 7 shows a cross-section of the reed spring 111 taken along the line VII—VII in FIG. 6. "L" indicates the height of each leg 112, in other words, it represents a maximum lift of the outlet reed valve 84 against the spring force produced by the legs 112.

Figure 8:
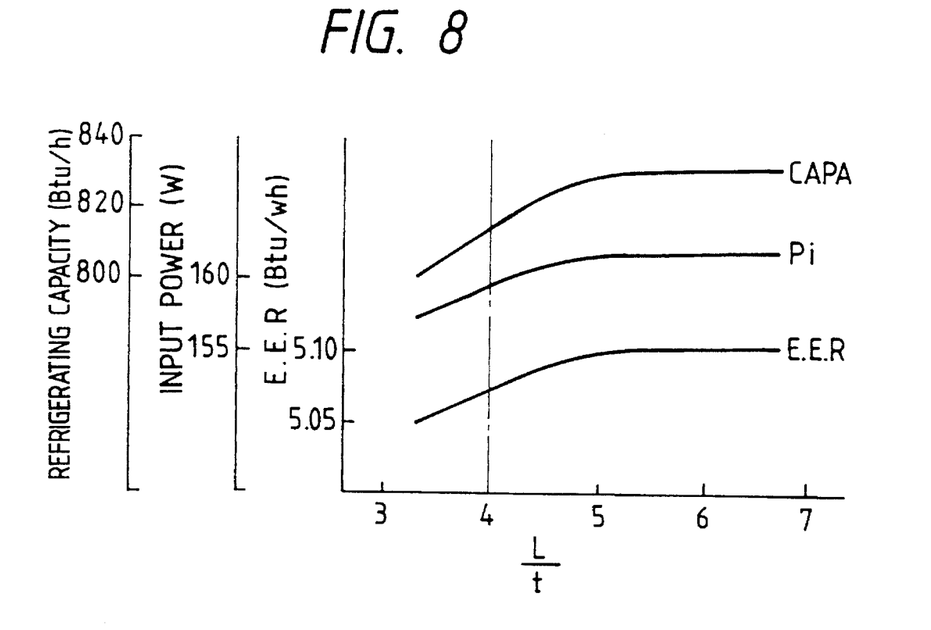
FIG. 8 is a graph which shows the relation between the performance of a compressor of the invention and the height L of legs of a reed spring of a valve assembly.

FIG. 8 is a graph which shows the relation between the performance of the compressor of this embodiment and a lift L of the outlet reed valve 84. An abscissa axis indicates a value derived by dividing the lift L (mm) of the outlet reed valve 84 by the thickness t (mm) thereof. Ordinate axes denote the refrigerating capacity (Btu/h), the input power (W), and the energy efficiency ratio E.E.R. (Btu/Wh), respectively. The compressor has a cylinder capacity of 7.3 cm$^3$ and uses a refrigerant gas HFC-134a.

The graph shows that as a value of L/t reaches about 4, the performance of the compressor is increased and then becomes stable when the value of L/T exceeds about 5. Thus, it is advisable that the legs 112 of the outlet reed valve 84 be bent so as to set the lift L to a value of more than four times the thickness of the outlet reed valve 84.

Figure 9:
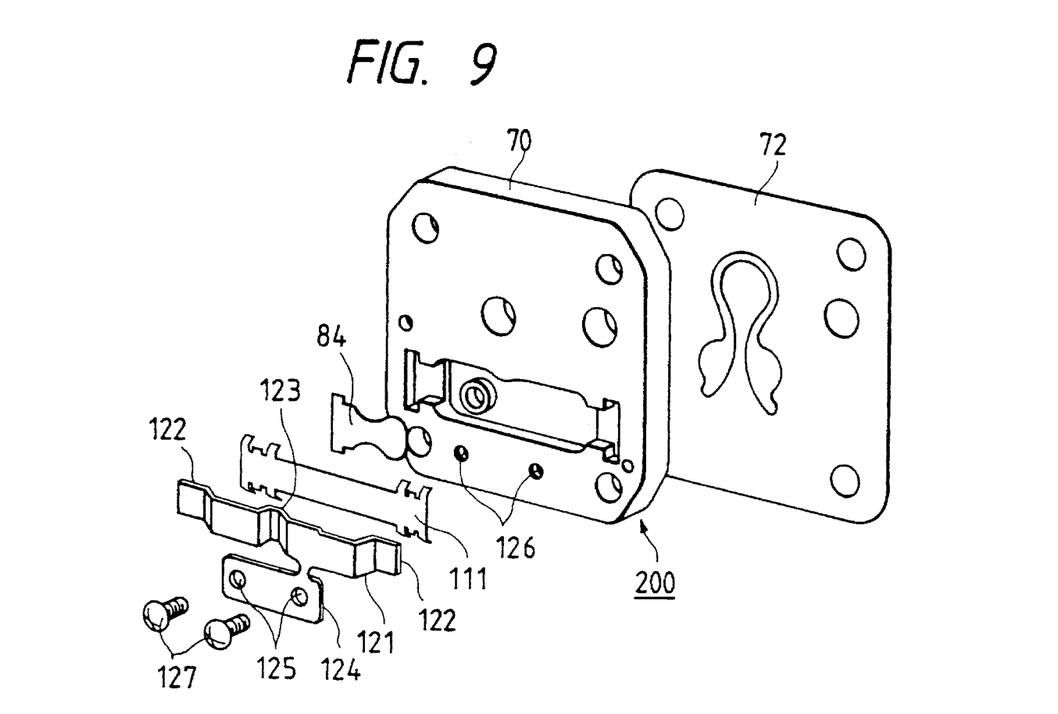
FIG. 9 is an exploded perspective view which shows a valve assembly of a compressor unit according to a second embodiment.

Referring to FIG. 9, there is shown a modification of the valve assembly 200. The like reference numbers refer to like parts in the above mentioned first embodiment and explanation thereof in detail will be omitted here.

The valve assembly 200 includes an inlet reed valve 72, a valve plate 70, an outlet reed valve 84, a reed spring 111, a spring retainer 121, and screws 127.

The spring retainer 121 includes two curved portions, as illustrated, so as to provide elasticity to both end portions 122 which press the reed spring 111. Between the curved portions, a contact surface 123 is formed which restricts deformation of the reed spring 111 when pressed by the outlet reed valve 84. The spring retainer 121 further includes a mounting plate 124 which has formed therein a pair of holes 125 through which the screws 127 are inserted into threaded holes 126 formed in the valve plate 70 to secure the spring retainer 121 on the valve plate 70.

Figure 10:
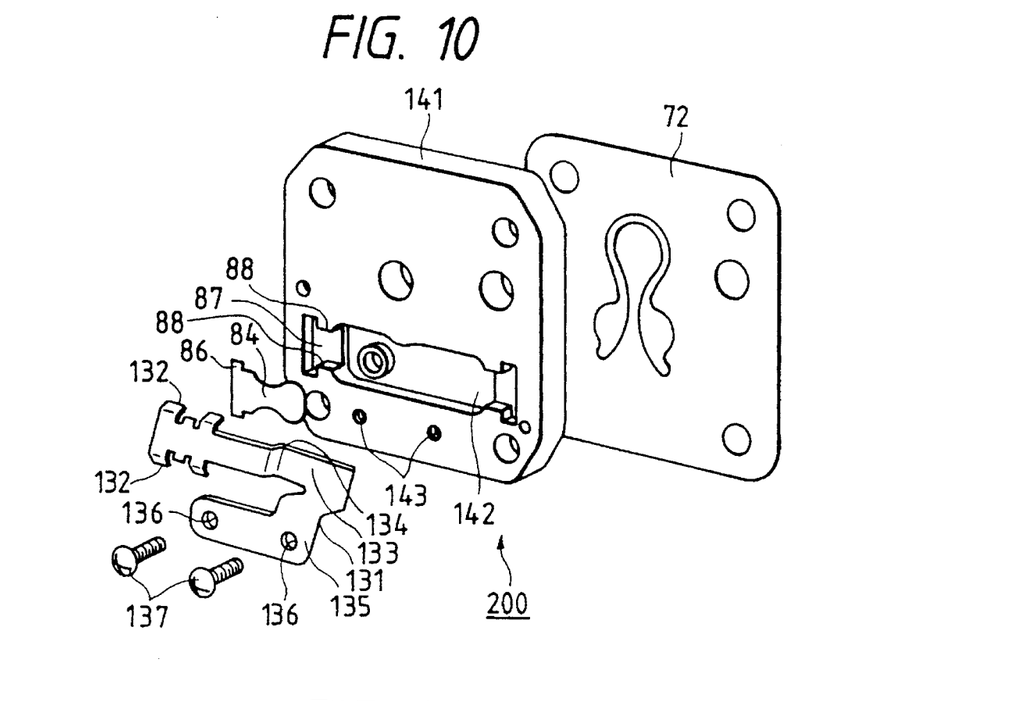
FIG. 10 is an exploded perspective view which shows a valve assembly of a compressor unit according to a third embodiment.

Referring to FIG. 100 there is shown a third embodiment of the valve assembly 200.

The valve assembly 200 as shown is different from the above mentioned embodiments in structures of a valve plate 141 and a retainer 131.

The retainer 131 also has a function of the reed spring 111 discussed in the above embodiments, and includes a leg portion having a plurality of legs 132, a contact portion 134, an arm portion 133, and a mounting portion 135. The legs 132, similar to the above embodiments extend In opposite directions to press an outlet reed valve 84 under a given pressure. The contact portion 134 contacts the outlet reed valve 84 when being opened to restrict the movement thereof. The arm portion 133 is designed to create a spring force serving to absorb impact when the outlet reed valve 84 is opened and hits the contact portion 134.

The valve plate 141 includes a recessed portion 142 which has a pair of inwardly oriented protrusions 88 to define an end housing 87. The legs 132 of the retainer 131 engage the protrusions 88 with the outlet reed valve 84 being sandwiched therebetween to retain extensions of the outlet reed valve 84 in the end housing 87.

The mounting portion 135 has formed therein a pair of holes 136 through which the screws 137 are inserted into threaded holes 143 formed in the valve plate 141 to secure the retainer 131 on the valve plate 141.

In operation, refrigerant gas returned from a refrigeration system first enters the inlet plenum chamber 75 of the cylinder head 74 through the muffler 77 and then is sucked according to activities of the valve 80 following movement of the piston 61 into the compression chamber 58 through the inlet port 78 of the valve plate 70 or 141.

When the piston 61 is displaced to the valve plate 70 or 141, it will cause the refrigerant gas to be compressed which, in turn, presses the outlet reed valve 84 and the reed spring 111 or the retainer 131 through the outlet port 79 of the valve plate and enters the outlet plenum chamber 76 of the cylinder head 74 so that it is discharged to the refrigerant system.

With the above arrangements, operational noise of the compressor with a cylinder capacity of 7.3 cm$^3$ is reduced to 8 dB from 44 dB at which a conventional compressor raises noise since unlike the conventional structure, there is formed only one outlet port 79 which is a major cause of the operational noise.

Additionally, since the outlet reed valve 84 is, as discussed above, pressed by the two legs, the pressure acting on the outlet reed valve 84 may be set small so that the outlet reed valve 84 is opened quickly. This avoids overcompression in the compression chamber.

Further, since the 118 and 117 clearances, as discussed above, exist between the outlet reed valve 84 and the reed spring 111 and between the reed spring 111 (or 131) and the retainer 92 (or 121), when the outlet reed valve 84 is opened to push the reed spring 111, it will cause the reed spring to produce a reaction force which acts on the outlet reed valve so that it is closed quickly as pushed by a hard spring. This results in decreased amount of refrigerant gas re-expanding in the compression chamber.

The energy efficiency ratio E.E.R. is, therefore, improved. For example, the conventional compressor with a cylinder capacity of 7.3 cm$^3$ provides a refrigeration capacity of 815 Btu and an energy efficiency ratio of 5.06 (Btu/Wh) at an input power of 160.8 W. The compressor of the invention provides a refrigeration capacity of 796 Btu and an energy efficiency ratio of 5.11 (Btu/Wh) at an input power of 155.7 W. The energy efficiency ratio is found to be increased by 0.05 (Btu/Wh).

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A hermetic compressor, comprising:

an enclosed compressor casing; and a compressor unit disposed within said compressor casing, said compression unit including a compression chamber and a valve assembly having an inlet port arranged to introduce medium to be compressed into the compression chamber and an outlet port arranged to discharge the medium compressed in the compression chamber, the valve assembly including a valve plate, a single outlet reed valve and a spring member, the valve plate having formed wherein a recessed portion in which the outlet port is formed, the outlet reed valve having a supporting portion and a valve portion for selectively opening and closing the outlet port according to a pressure level of the medium compressed in the compression chamber, the released portion having protrusions protruding inward in the recessed portion to define an outlet reed valve housing in which the supporting portion of the outlet reed valve is secured, the spring member having a plate portion and a plurality of legs extending from the plate portion designed to engaged the protrusions of the recessed portion to retain the outlet reed valve in the outlet reed valve housing and tho provide a spring force service to restrict an opening motion of the valve portion of the outlet reed valve, the legs of the spring member being bent relative to the plate portion to have a given height from the plate portion so as to create a preselected interval between the outlet reed valve and the plate portion of the spring member.

2. A hermetic compressor as set forth in claim 1, wherein the given height of the legs is more than four times the thickness of the outlet reed valve.

3. A hermetic compressor as set forth in claim 1, wherein the spring member includes a mounting portion which secures the outlet reed valve on the valve plate.

4. A hermetic compressor as set forth in claim 1, wherein the plate portion of the spring member has a preselected length, and the legs of the spring member are arranged at a given interval in a lengthwise direction of the plate portion to engage the protrusions of the recessed portion to retain the spring member in the recessed portion.

5. A hermetic compressor as set forth in claim 2, wherein the legs of the spring member extend from the plate portion in opposite directions to form two contact points with the outlet reed valve.

6. A hermetic compressor as set forth in claim 1, wherein the valve assembly further includes a mounting member for mounting the spring member in the recessed portion of the valve plate through the outlet reed valve.

7. A hermetic compressor as set forth in claim 6, wherein the mounting member includes a body portion and stepped portions, the stepped portions being arranged to form a predetermined interval between the spring member and the body portion and to press the spring member under a given pressure.

8. A hermetic compressor, comprising:

an enclosed compressor casing; and a compressor unit disposed within said compressor casing, said compressor unit including compression chamber and a valve assembly having an inlet port arranged to introduce medium to be compressed into the compression chamber and an outlet port arranged to discharged the medium compressed in the compression chamber, the valve assembly including a valve plate having a single outlet reed valve and a spring member, the valve plate having formed therein a recessed portion in which the outlet port is formed, the outlet reed valve having a supporting portion and a valve portion for selectively opening and closing the outlet according to a pressure level of the medium compressed in the compression chambers, the recessed portion having protrusions protruding inward in the recessed portion to define an outlet reed valve housing in which the supporting portion of the outlet reed valve is secured, the spring member having a plate portion and a plurality of legs extending from the plate portion, designed to engage the protrusions of the recessed portion to retain the outlet reed valve in the outlet reed valve housing and to provide a spring force service to restrict an opening motion of the valve portion of the outlet reed valve, the valve assembly further including a mounting member for mounting the spring member in the recessed portion of the valve plate together with the outlet reed valve, the mounting member including two curved portions to form a contact surface therebetween and pressing end surfaces, the pressing end surfaces being arranged to press the spring member under a given pressure, the contact surface being arranged to restrict deformation of the spring member when pushed by the outlet reed valve being opened.

* * * * *